United States Patent [19]

Hofgen

[11] Patent Number: 4,613,864
[45] Date of Patent: Sep. 23, 1986

[54] POSITION-FIXING SYSTEM

[75] Inventor: Günter Hofgen, Kornwestheim, Fed. Rep. of Germany

[73] Assignee: International Standard Electric Corporation, New York, N.Y.

[21] Appl. No.: 571,012

[22] Filed: Jan. 16, 1984

[30] Foreign Application Priority Data

Jan. 19, 1983 [DE] Fed. Rep. of Germany ....... 3301613

[51] Int. Cl.⁴ .......................... G01S 5/02; H04B 7/185
[52] U.S. Cl. .................................... 343/357; 343/352; 364/449
[58] Field of Search ............... 343/356, 357, 387, 465, 343/463, 450, 352, 458; 364/449

[56] References Cited

U.S. PATENT DOCUMENTS

| | | | |
|---|---|---|---|
| 4,161,730 | 7/1979 | Anderson | 343/352 |
| 4,229,737 | 10/1980 | Heldwein et al. | 343/395 |
| 4,445,118 | 4/1984 | Taylor et al. | 343/356 |
| 4,470,141 | 9/1984 | Takada | 370/104 |

OTHER PUBLICATIONS

Navigation–Journal of the Institute of Navigation, Band 25, No. 2, Summer 1978, pp. 95–106, Milliken et al., "Principle of Operation of NAVSTAR and System Characteristics".

IEEE Transactions of Communications, Band COM-30, No. 5, May 5, 1982, pp. 1037–1047, Baier et al, "A Novel Spread Spectrum Receiver Synchronization Scheme Using a SAW-Tapped Delay Line".

Primary Examiner—Theodore M. Blum
Assistant Examiner—Gregory C. Issing
Attorney, Agent, or Firm—John T. O'Halloran

[57] ABSTRACT

Several satellites serving as reference stations ($S_j$) for a user revolve about the earth in different orbits. At least four reference stations must be within sight of a user station (N) at the same time. The user station measures the ranges to at least four reference stations by one-way ranging. From these ranges and the positions of the reference stations, which are transmitted as data words, the user station determines its position.

To determine the positions of the reference stations, the ranges from the respective reference station to at least three ground stations ($B_i$) are measured by two-way ranging. From these ranges and the known positions of the ground stations, the position of the reference station is obtained. The interrogation signals of all reference stations contain the same basic signal ($K_s$), which represents a pseudorandom code. The reply signals of the ground stations contain differently coded signals ($K_{Bi}$), so that the ground stations are identifiable with the aid of the codes assigned to them. If the interrogation and reply signals contain the times of transmission ($t_j$) and arrival ($t_i$), respectively, of the interrogation signal, and the signal transit times are measured, the clocks of the reference stations and of the ground stations can be synchronized.

8 Claims, 3 Drawing Figures

POSITION-FIXING SYSTEM

BACKGROUND OF THE INVENTION

The present invention relates to a position-fixing system.

A position-fixing system of the prior art is, for example, the Global Positioning System (GPS), a satellite-based navigation system developed in the U.S.A. especially for military applications. The GPS is described in "NAVIGATION, Journal of the Institute of Navigation", GPS Special Issue, Vol. 25, No. 2, Summer 1978, pages 93-106.

In the GPS, about 18 satellites are in orbit. Their orbital period is 12 hours. The satellites are the reference stations for the users of the system, who determine their positions from the positions of the reference stations and the signal transit times to at least four reference stations. A ground control station determines the positions of the satellites' orbits with high accuracy. The orbital data thus determined are transmitted to the satellites. To obtain a fix, a user measures the signal transit times to four reference stations by one-way ranging. In theory, the user position can be determined from three ranges. Since in practice, however, the clocks always differ from the system time, four measurements are made. Four equations are then available for establishing a fix, and it is possible to determine, besides the three unknown coordinates, a fourth unknown, namely the user clock offset from the system time.

To be able to determine his position, the user must precisely known the positions of the reference stations. He determines these positions from the satellites' orbital data transmitted from the ground station to the satellites and from there to the user, and from the time difference between the instants at which the orbital data of the respective satellite were determined by the ground control station and the instant at which the position of the reference station (i.e., the satellite) is determined from the orbital data at the user station. In the GPS it is necessary that all satellites be continuously in operation. The signals transmitted from the satellites are modulated with different codes.

SUMMARY OF THE INVENTION

The object of the invention is provide a position-fixing system which can be implemented at low cost.

The reference stations determine their positions themselves. This can be done at low cost and with high accuracy. It eliminates the need for a ground control station which determines the orbital data of many satellites with high accuracy by means of costly and complicated equipment. Furthermore, the requirement for both the reference stations and the user station to be equipped with precision clocks (e.g., atomic clocks) is eliminated.

To determine the positions of the satellites, the ranges to several ground stations are measured by a two-way ranging method. Thus only the ranges to at least three ground stations, not to at least four ground stations as is the case with the one-way ranging method, have to be measured (from each satellite). This also makes it possible to define the position by intersections of spheres rather than hyperboloids of revolution, which gives a further improvement in accuracy.

From these ground stations, line-of-sight communication is possible with only a limited number of reference stations. The reference stations are controlled to transmit their signals on a time-devision multiplex basis. Thus their signals need not be distinguishable from one another (the signals of all reference stations may be modulated with the same code), which reduces the equipment complexity at the user station. Compared with the prior art position-fixing system, the reference stations are active for a considerably shorter time, so that power requirements are greatly reduced.

With a sufficiently large number of ground stations, global coverage can be provided.

The novel position-fixing system can be expanded to permit synchronization of the clocks of the reference stations and the ground stations.

BRIEF DESCRIPTION OF THE DRAWNGS

The inventions will now be explained in more detail, by way of example, with reference to the accompanying drawings, in which.

DESCRIPTION OF THE PREFERRED EMBODIMENT

First the operation of the position-fixing system will be explained with the aid of FIG. 1.

Figure 1:
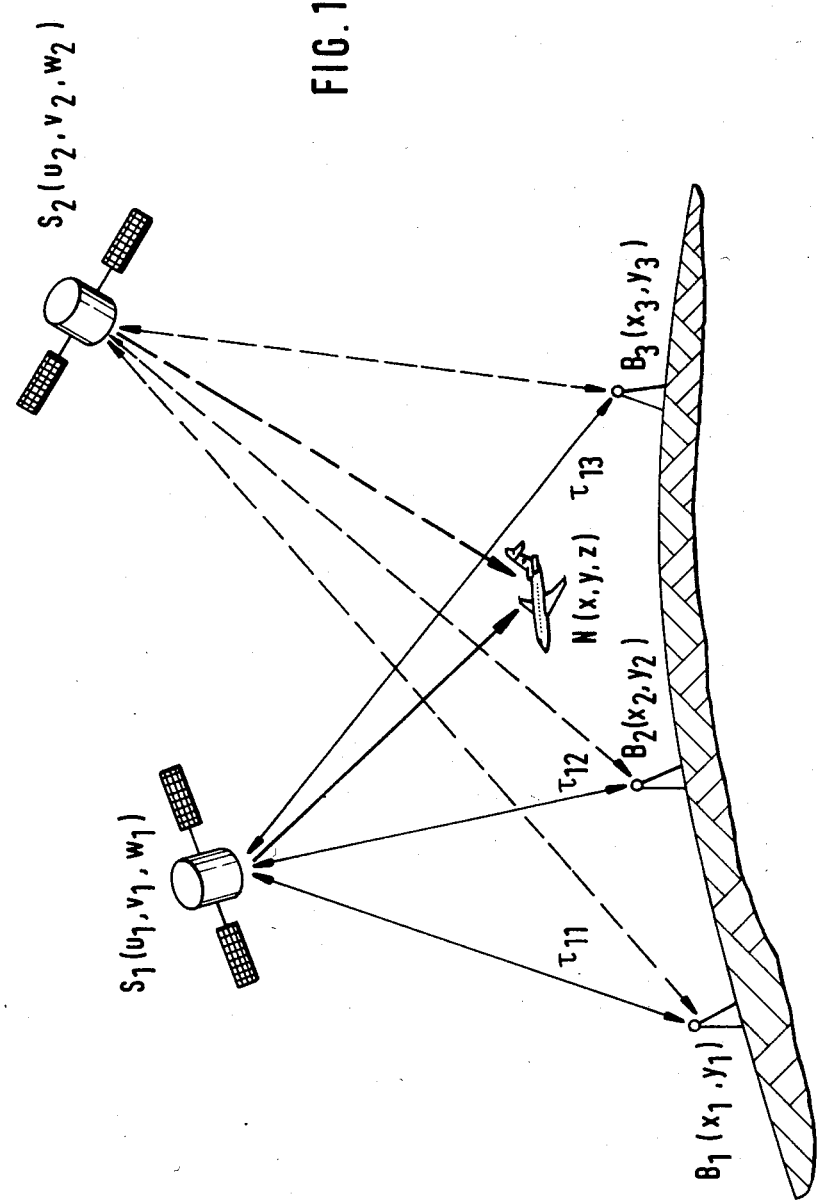
FIG. 1 is a schematic representation illustrating the operation of the novel position-fixing system.

FIG. 1 shows three ground stations $B_1$, $B_2$, $B_3$, two reference stations $S_1$, $S_2$, and a user station N. To determine the position of the user station N, at least four reference stations $S_j$ are required. To determine the positions of the satellites used as reference stations in determining the position of a user station, at least three ground stations $B_i$ are required. With a sufficient number of ground stations and a sufficient number of reference stations, global coverage is obtained. The orbits of the satellites and the locations of the ground stations must be chosen so that at least four reference stations are within line-of-sight of the user station. On the other hand, each of these at least four reference stations must be within line-of-sight of at least three ground stations (which need not be the same for the four reference stations).

Each reference stations $S_j$ measures the ranges to at least three ground stations $B_i$ by a two-way ranging method. From these ranges and the known positions of the three ground stations, the reference station determines its position. The reply signals from the ground stations contain differently coded signals. With the aid of these different signal codes ($K_{Bi}$), the ground stations are identifiable at the reference stations. The positions of the ground stations are stored at the reference stations.

It is also possible to determine the distance between a reference station and a ground station. This information must then be transmitted to the reference station.

To minimize the power consumption at the reference stations, the latter are activated not continuously but during given intervals within a period of time (frame duration). Of the reference stations of a coverage area, only one is active at a time, i.e., the reference stations are operated in a time-division-multiplex mode. This has the additional advantage that the signals of all reference stations can be modulated with the same code $K_S$; the receivers of the user stations then need to be capable of processing only one code, too. To control the satellites, i.e., the reference stations, a central telemetry station is used, which also determines the order in which the reference stations are activated. The reference stations determine their positions by two-way ranging. These positions are transmitted in the form of data words to the user station N. Alternatively, the data required to produce a fix (signal transit times or distances between reference and ground stations) may be transmitted to the user station, which then determines the positions of the reference stations. In any case, to determine the position of the user station, the positions of at least four reference stations must be known at the user station. The user station measures the pseudo-ranges to these reference stations by one-way ranging. Four equations with the four unknowns x, y, z (user position), and $\Delta t$ (user clock offset from system time) are obtained in a manner known per se. From these four equations, the user position and the user clock offset from the system time can be calculated. This one-way ranging and the calculations of positions can be performed in the same way as in the GPS.

For one-way ranging, the signals radiated from the reference stations are modulated with a pseudo-noise (PN) code. Such a PN code consists of a sequence of 1,023 chips. Since the reference stations are active successively rather than simultaneously, the signals of all reference stations can be modulated with the same code $K_s$. As will be explained in more detail in the following, signals modulated with a PN code are also used for two-way ranging, for which each ground station is assigned a given code $K_{Bi}$.

Figure 2:
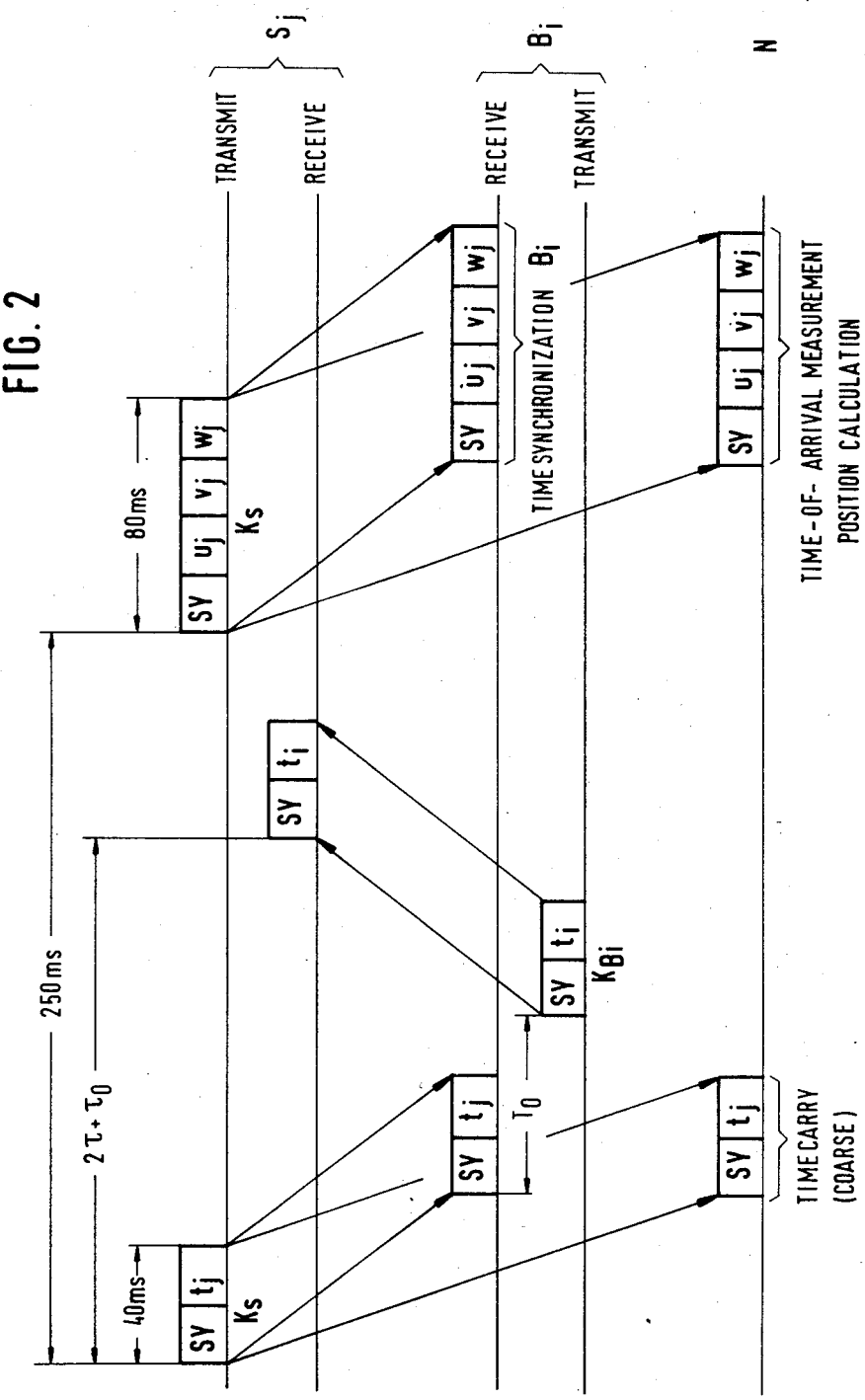
FIG. 2 show the signals transmitted from the reference stations, the ground stations and the user station.

The following explains with the aid of FIG. 2 how the two-way ranging is carried out. The interrogation signal is 40 ms long and is divided into two 20-ms parts. The first part is a synchronization preamble SY, and the second part contains the time $t_j$ of the reference station in coded form.

The synchronizaton preamble consists of a sequence of basic signals (each formed by a PN code). The characters "0" and "1", which specify the time $t_j$ in coded form, are represented by the basic signals, too, namely by the uninverted basic signal and the inverted basic signal, respectively. The signal for two-way ranging is received and decoded by a ground station $B_i$. After a time $T_O$ ($T_O$=60 ms), the ground station transmits a reply signal. The reply signal has the same structure as the interrogation signal and contains a synchronization preamble and, in coded form, the time of arrival $t_i$ at the ground station $B_i$ of the interrogation signal radiated by a reference station $S_j$. The basic signal contains the code $K_{Bi}$. The reply signal is received by a reference station $S_j$ after the time $2\tau_{ji}+T_O$, where $\tau_{ji}$ is the range-dependent transit time between the reference station $S_j$ and the ground station $B_i$. From the time $\tau_{ji}$, the range is determined in a manner known per se. To avoid ambiguities in the distance measurement, the time $t_j$ is transmitted from the reference station to the ground station, and the time $t_i$ from the ground station to the reference station. The transit time $\tau_{ji}$ is $$\tau_{ji} = t_i - t_j + \Delta t.$$

Of the reference stations whose signals can be received by a user, only one is active at any given time. It therefore suffices to provide only one basic signal containing the code $K_s$ for all reference stations. The interrogation signal containing this basic signal, however, is received by several ground stations $B_i$, each of which radiates a reply signal after $T_O$. To be able to distinguish between the reply signals from the individual ground stations, each ground station $B_i$ is assigned an individual basic signal with the code $K_{Bi}$. The reply signals from the individual ground stations are processed by the reference station in parallel. 250 ms after transmission of the interrogation signal, the reference station transmits a signal whose structure is similar to that of the interrogation signal. It consists of a synchronization preamble of 20 ms duration and three further 20-ms parts which contain the coordinates $u_j$, $v_j$, and $w_j$ of the reference station $S_j$ in coded form. The basic signal contains the code $K_s$ again.

This signal not only serves to transmit the coordinates of the reference station $S_j$ from the latter to the user station N but also is used by the user station N to measure the range to the respective reference station $S_j$ by one-way ranging. One-way ranging is performed in the known manner by measuring the difference between the time of arrival of the signal at the user station and the instant at which the reference station radiated this signal. To determine user clock offsets from the system time, the ranges to four reference stations are measured.

The interrogation signal transmitted from the reference station to the ground station is also received by the user station and decoded there. Thus the time $t_j$, at which the interrogation signal was transmitted for two-way ranging, is roughly known at the user station. As the user station also knows the range to the reference station (one-way ranging), this time information can be used to detect and compensate for coarse time deviations.

Figure 3:
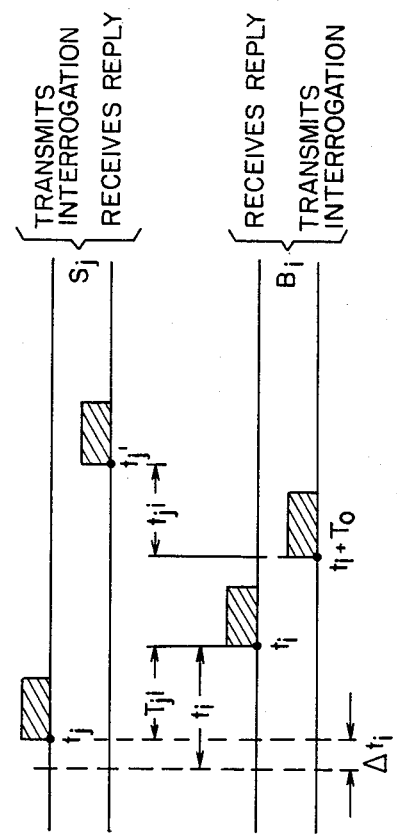
FIG. 3 is a sketch illustrating the synchronization of the clocks.

In the novel position-fixing system, the clocks at the reference stations $S_j$, i.e., in the satellites, and at the ground stations $B_i$ can be synchronized in an advantageous manner. This is done as follows (FIG. 3):

The time indicated by the clocks at the reference stations and the ground stations will be designated $Z(S_j)$ and $Z(B_i)$, respectively.

The interrogation signal for two-way ranging is transmitted from the reference station $S_j$ to the ground station $B_i$ at the instant $t_j$ of the time $Z(S_j)$ and arrives at the ground station after the transit time $\tau_{ji}$. The ground station indicates the time $t_i$ of the time $Z(B_i)$. If $Z(S_j)$ and $Z(B_i)$ are synchronized, then $t_i = T_j + \tau_{ji}$. If the time $t_j$ differs from the time of the ground station by $\Delta t_i$, then $t_i = t_j + \Delta t_i + \tau_{ji}$. The reply signal arrives at the reference station $S_j$ at the instant $t_j'$. The following equation holds: $t_j' - t_j = 2\tau_{ji} + T_O$. Since $T_O$ is known, $\tau_{ji}$ can be calculated from this equation. Thus it is possible to determine $\Delta t_i = t_i - \tau_{ji} - t_j$. Each reference station $S_j$ measures the offset $\Delta t_i$ of its clock from the clocks of several ground stations $B_i$; then, the average $$\Delta t_k = \frac{1}{n} \sum_1^n \Delta t_i$$

is taken. This average specifies the clock offset from the system time.

The system time is now available at the reference station. This, in turn, enables the ground stations to determine the offsets of their clocks from the system time in a similar manner. From the coordinates of the reference station ($u_j$, $v_j$, $w_j$), which are transmitted to the ground station, and the coordinates of the ground station, the distance between the two stations is determined. In addition, the instant at which the reference station radiates the signal is transmitted to the ground station. The latter measures the instant of arrival of this signal. From these values, a correcting value is calculated. With these corrections, the system time is available at both the reference stations and the ground stations.

As mentioned previously, the reference stations radiate their signals on a time-division multiplex basis. 250 ms after transmission of each 40-ms interrogation signal, a signal is radiated which contains the coordinates of the reference station. With 18 satellites in different orbits around the earth, simultaneous line-of-sight communications are possible between a user and a maximum of six satellites (reference stations). Accordingly, only these six satellites have to transmit on a time-division multiplex basis. If the orbits are suitably chosen, three satellites can transmit their signals at the same time. The following time pattern is possible:

| Reference station | Instant of transmission |
|---|---|
| $S_1, S_7, S_{13}$ | $T_R + 0$ ms |
| $S_2, S_8, S_{14}$ | $T_R + 90$ ms |
| $S_3, S_9, S_{15}$ | $T_R + 180$ ms |
| $S_4, S_{10}, S_{16}$ | $T_R + 520$ ms |
| $S_5, S_{11}, S_{17}$ | $T_R + 610$ ms |
| $S_6, S_{12}, S_{18}$ | $T_R + 700$ ms. |

This gives a frame duration von 1,040 ms.

Four to five ground stations are sufficient for Europe-wide coverage, and 18 to 24 ground stations for worldwide coverage.

The reference stations move on between the measurements. The effect of the motion on the measurement can be compensated for in a manner known per se, e.g., by forming a trace (for instance, two measurements are made at different times, and the difference is formed. This value is used for extrapolation with respect to the instant of transmission of the signal containing the coordinates of the reference station. This signal is then transmitted at an instant which allows for the fact that the reference station has moved on between the instant at which it determined its position and the instant at which it transmits its position data). The fact that the user station is in motion, too, need not generally be taken into account because the resulting error is small in relation to measurement accuracy. If, however, the measurements are made with such a precision that the motion of the user station has to be taken into account, this will be done by a method analogous to that used in the reference station.

Due to the proper motion of the reference stations, the carrier frequency of a signal radiated from a reference station exhibits a Doppler shift of $f_D$. This Doppler shift is determined at the ground station receiving this signal. The signal transmitted from the ground station is shifted by the inverse measured Doppler shift, $-f_D$, i.e., the signal received by the reference station no long contains a Doppler shift. Therefore, the reference stations can be simple in construction.

I claim:

1. A position-fixing system wherein a user station (N) determines its position from the ranges to and the positions of several reference stations ($S_j$) carried by satellites, the ranges being measured by one-way ranging, and wherein the signals used for position-fixing purposes are radio-frequency signals, characterized in that the reference stations ($S_j$) are controlled so that only one of the reference stations within sight of the user station is active at any given time, that the ranges from each of several ground stations ($B_i$) to each reference station ($S_j$) are measured by a two-way ranging method, wherein an interrogator station, the reference station or the ground station, transmits interrogation signals while a transponder station, the ground station or the reference station, transmits reply signals, and that the position of a reference station is defined by the intersection of spheres having their centers at the ground stations, the radii of the spheres being the ranges from the respective ground station to the respective reference station and further characterized in that the interrogation signals and the reply signals each consist of two parts (FIG. 2) the first of which is a synchronization preamble (SY), and the second of which indicates when the interrogation signal was transmitted ($t_j$) from the interrogator station and received ($t_i$) by the transponder station, respectively.

2. A position-fixing system as claimed in claim 1, characterized in that the position of a reference station is determined at said reference station, and that the position data are transmitted to the user station.

3. A position-fixing system as claimed in claim 1, characterized in that the measured ranges from the ground station to the reference station, or signal transit times from which the ranges can be determined are transmitted to the user station, and that the positions of the reference stations are determined at the user station.

4. A position-fixing system as claimed in claim 1 characterized in that the interrogation and reply signals of a sequence of like basic signals ($K_S$, $K_{Bi}$) each forming a pseudorandom code.

5. A position-fixing system as claimed in claim 4 characterized in that the basic signals ($K_s$) are the same for all reference stations, and that each ground station is assigned an individual basic signal ($K_{Bi}$), so that the ground stations can be identified with the aid of the basic signals transmitted by them.

6. A position-fixing system as claimed in claim 1 characterized in that the signal transit times between the interrogator and transponder stations and the transmitted times are used to synchronize the clocks at the reference stations.

7. A position-fixing system as claimed in claim 6, characterized in that a correcting value or correcting the clock at the ground station is derived from the distance between a reference station and a ground station, the instants at which the reference station transmits a signal and at which the ground station receives this signal, and the delay of this signal in the ground station.

8. A position-fixing system as claimed in claim 1, characterized in that the Doppler shift ($f_D$) of the received signal is determined at each of the ground stations, and that the frequency of the signal transmitted from the ground station is shifted by the inverse Doppler shift with respect to the nominal transmission frequency.

* * * * *